Figure 1:
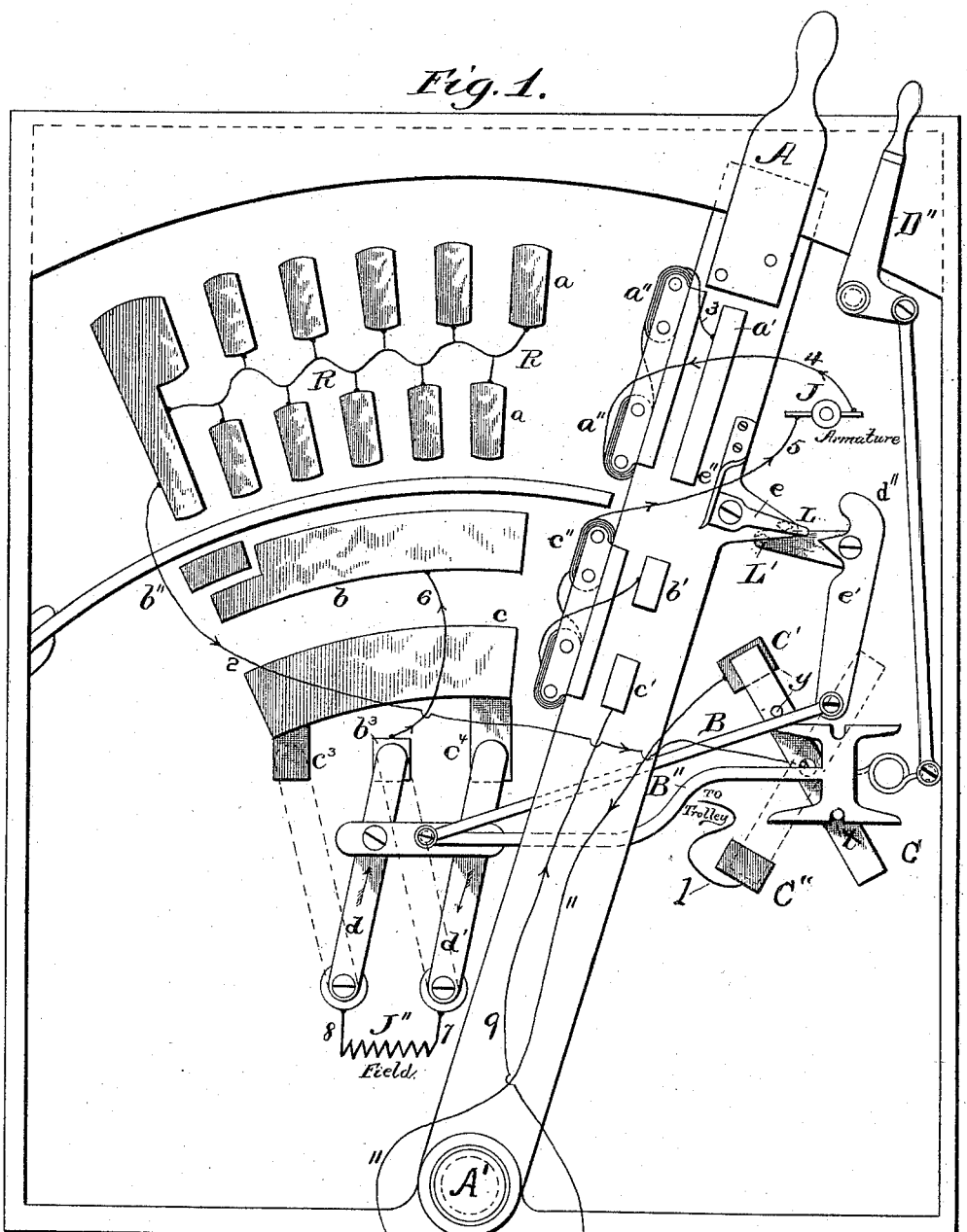

(No Model.) 2 Sheets—Sheet 2.
E. A. SPERRY.
APPARATUS FOR ARRESTING MOTION OF ELECTRICALLY PROPELLED MECHANISM.
No. 534,975. Patented Feb. 26, 1895.
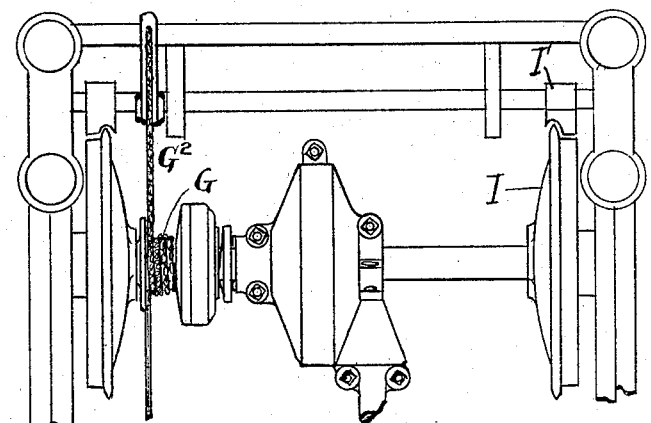
Fig. 2.
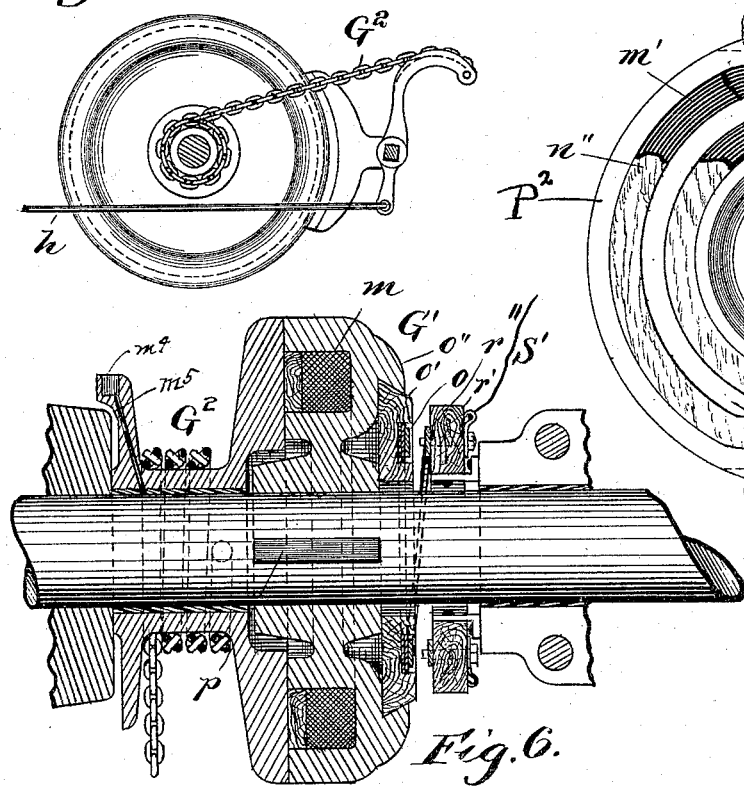
Fig. 3.
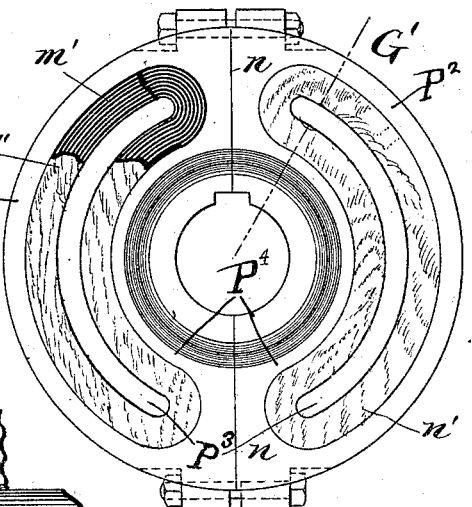
Fig. 4.
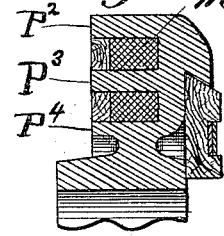
Fig. 5.
Fig. 6.
WITNESSES.
Frank Miller.
J. B. McGirr.
INVENTOR.
Elmer A. Sperry
By Buckingham & Ewart
Attorneys

UNITED STATES PATENT OFFICE.

ELMER A. SPERRY, OF CLEVELAND, OHIO, ASSIGNOR TO THE SPERRY ELECTRIC RAILWAY COMPANY, OF OHIO.

APPARATUS FOR ARRESTING MOTION OF ELECTRICALLY-PROPELLED MECHANISM.

SPECIFICATION forming part of Letters Patent No. 534,975, dated February 26, 1895.

Application filed February 5, 1894. Serial No. 499,230. (No model.)

*To all whom it may concern:*

Be it known that I, ELMER A. SPERRY, a citizen of the United States, residing at Cleveland, in the county of Cuyahoga and State of Ohio, have invented new and useful Improvements in Apparatus for Arresting Motion of Electrically-Propelled Mechanism, of which the following is a specification.

My invention relates to a system of controlling electric motors whereby the motor or motors may be automatically transformed into a generator, and the currents so generated may be applied to further retard the cars or moving mass either through mechanical application of the brake shoes, its direct retardation, through the absorption of power from the moving mass, or the direct influence of the clamping and electrical generating properties of devices hereinafter described.

It further consists in details of construction of a controller whereby the changes from motor to generator may be automatically brought about; and also in details of construction of the magnetic brake and also its operating mechanism; all of which is shown in the accompanying drawings, in which—

Figure 1 is a front view of the controller, showing motor, brake mechanism and circuit connections in diagram. Figs. 2 and 3 illustrate the application of the brake reel upon a truck. Figs. 4 and 5 illustrate the details of construction of the brake reel; and Fig. 6 illustrates a form of mounting and also an alternate form of brake magnet.

Similar letters of reference indicate like parts throughout.

With reference to Fig. 1, the controller resistance R is divided and furnished with a number of contacts $a\ a$. On an arm A pivoted at A' the co-operating contact $a'$ is located. Other stationary contacts $b\ b''$ and $c$ co-operate with contacts $b'$ and $c'$ upon the arm. Blow-out magnets $a''$ and $c''$ are mounted on the arm A for rupturing the arc when the circuits of any of the contacts are broken. A multi-contact switch is shown below provided with arms $d$, $d'$ co-operating with contacts $c^3$, $c^4$ and a central contact $b^3$. The switch arm or main moving element A, is provided at a suitable point with a pivoted finger $e$ being provided with a centralizing spring $e''$ and co-operating with a notched cam $e'$ constituting a switch shifter. The cam is connected by link B for operating the switches. A brake switch C operates on contacts C' and C'', the latter connected with the trolley or other source of current supply. The mechanical relation of the switch C and switches $d$, $d'$, is controlled by handle D'' and connections $d''$ which are flexible in part so as to bring the notches upon the link B'' to co-operate with the two pins $x$ and $y$ upon either side of the pivot of the switch arm C. In one of the circuits in Fig. 1 is shown the coils $m'$ in proximity to a brake reel G loose upon the car axle H said reel being attracted by magnet G' which is secured upon such axle thereby winding up brake chain $G^2$ and applying the brake shoes I' to the car wheels I. The motor upon the car is indicated by the commutator J, and field J''. An interlocking or correcting device is indicated by the diamond L mounted upon and moving with the main moving element, and a co-operating diamond L' secured to a projection of the notched cam $e'$. These may be seen in Fig. 1.

Referring now to Fig. 3, the rod $h$ extends to other brakes which may exist on the same car, or on other cars coupled to the motor car and operated by it, the brakes thus coupled being actuated from a single reel G.

By reference to the remaining figures, the magnet G' is constructed of an iron casing in the face of which are sunk concentric or practically concentric grooves $m$ in which are wound the magnet coils $m'$, one or more on either side of the division or separating line $n$ of the magnet, the arrangement being one of great importance. The three pole or double magnetic circuit of the brake magnet thus formed, shown in Fig. 4, has been found especially useful in reducing the length of the magnetic path, requiring therefore less energy to maintain the requisite magnetism, half of the total magnetic flux traveling each circuit, one magnetic circuit lying in an outer and the other in an inner direction from the middle pole $P^3$, which is of opposite polarity to the other two poles, the outer being indicated at $P^2$ and the inner pole at $P^4$. Another striking feature in connection with the use of this magnet is that it not only requires less weight and mass in itself, but also requires only half the thickness of the co-operating "keeper" or armature as compared with the single magnetic circuit illustrated in Fig. 6, in which throughout the magnetic path in the "keeper" a thickness of metal is required for the total flux of the magnetic lines, whereas in the double-circuit magnet at no place in the keeper is a section required greater than to accommodate half of the total flux or half only of the section or weight of metal. When it is considered that this arrangement is to be used upon a vehicle the lightness of the parts is of great importance. This effect may be still further enhanced by arranging the plurality of groups of poles so that they will be concentrically disposed. Other dispositions of coils and form of coupling may be used. These, however, are shown coupled in multiple, one terminal of each being grounded to the frame, the other being led to the contact $o$ mounted on insulation $o'$ which is locked by a bevel face $o''$ when the halves of the magnet $C'$ are secured together and upon the driving key $p$. Co-operating with the revolving contact $o$ is a stationary contact $r$ mounted on insulation $r'$, suitably supported on any stationary portion, provided with electrical connections $S'$ constituting wire 11. The magnet coil $m'$ is preferably protected by a metallic shield $n'$, shown broken at $n''$, Fig. 4.

It will be understood that the switch shifter containing the two cam slots is operated by the finger $e$ each time the moving element of the controller is thrown to a predetermined position, being in Fig. 1 the extreme position to the right at which the circuits of the controller are opened. In this connection it will also be seen that the circuits of the two switch arms $d\ d'$, as well as the switch arm C are also in series circuit relation with the contacts directly controlled by the said moving element, and may therefore be open-circuited by its movement.

The co-operating diamonds L and L' interlock for the purpose of compelling the full movement of the pivoted cam by preventing withdrawal of the moving part A before the complete oscillation of the cam has taken place.

The brake reel is preferably separable for ease of attachment, being secured by dovetailed tongue and groove upon the faces of the joint. This joint is in lieu of bolts through the reel G, an oil cavity $m^4$ and oil duct $m^5$ serving to lubricate the journal of this reel.

The use and operation of the invention are as follows: The current emanating from trolley when the circuit is closed by movement of arm A flows on wire 1 to contact $C''$, to switch C, thence on wire 2, resistance R, contacts $a\ a$ to contact $a'$, thence by wire 3, magnet $a''$, wire 4 to commutator J, by wire 5, through magnet $c''$, to contact $b'$, contact $b$, wire 6, contact $b^3$, switch arm $d'$, wire 7 in direction of arrow to field $J''$, wire 8, to switch arm $d$, contact $c^3$, (see switches in dotted lines,) contact $c$, contact $c'$, wire 9, to the return circuit indicated by $G^3$. When the switches C, $d$ and $d'$ are thrown into position shown in full lines in Fig. 1, connection from the source of supply is cut off, and the relations of the elements of the motor, namely, field and armature, are reversed, and upon closure of the circuit the current emanating at commutator brush near J would flow in direction of the arrow on wire 4 to magnet $a''$, wire 3 to contact $a'$, contact $a\ a$ to resistance R, wire 2 in direction of arrow, switch C to wire 11, in direction of arrow-heads to brake magnet coil $m'$, thence by wire 12 to the common return wire, the latter in case of two or more brake magnets. The current flows on wire 9 to contact $c'$, contact $c$, switch arm $d'$ which is now in position indicated in full line, wire 7, to field $J''$, wire 8, to switch arm $d$, contact $b^3$, wire 6, contact $b$, contact $b'$, wire 5, by way of blow-out magnet $c''$, thence through the armature back to the starting point. It will thus be seen that the current in traversing the local circuit may be controlled by resistance R, and in passing magnet $m'$ attracts the brake reel G causing same to wind the brake chain $G^2$ and apply the brake $I'$ to the wheel I and other wheels of the car or train, as will be readily understood. Should the current be more than a predetermined amount, more of resistance R should be included. It will be found that the braking action takes place very effectually even without the magnetic brake reel being attached to any device whatever for mechanical application of the brake shoes, through its magnetic adherence, acting directly to stop the rotating axle or wheel to which the magnet is attached.

The handle A in the position shown in Fig. 1 may be said to be in its "off" position, meaning that in its last movement it was withdrawn over the contacts $a$ in such a manner as to turn off the electric current from the motor. This last-named movement was continued to the right until the finger $e$ engaged one of the notches of the actuator $e'$ whereupon both the switches C' and the switches $d$ were thrown from their position in dotted lines to the position shown in full lines in the drawings. The next movement of the arm to the left passing over the contacts will be seen to close the circuit through the brake magnet and local circuit thus bringing the car to rest; when the handle will again be thrown to the right to its "off" position, in which operation the finger $e$ will engage the opposite notch of the actuator $e'$ and the switches will receive another reversal. It will thus be readily understood that the act of throwing off the current from the motor automatically converts the mechanism into a brake controller, and in throwing off the brake the mechanism is automatically reconverted into a motor-controller.

It will be readily understood that one manner in which my present invention is differentiated from the prior state of the art is that the current to operate the brakes is developed from a simple series wound motor, the circuit connections of which have been so adjusted by a switch that the currents produced will continue to flow through the field coils in the same direction as when operating as a motor. Moreover, the residual magnetism is depended upon to start or originate the generated current. The trolley or central station current, it will be observed, is entirely eliminated, and all connection therewith is broken off, before the braking action is commenced.

It has been found that much of the braking or retarding action is due to the generation of eddy currents in the mass of metal forming the brake reel, and by cutting the lines of force circulating through G'. It has also been found that this circulation is aided, and the retarding action increased by providing the metallic filling $n'$ between the magnetic poles, all of which is more fully described in a contemporaneous application, Serial No. 498,511, filed January 30, 1894. A similarity will also be seen between the present application and a contemporaneous application, Serial No. 490,698, filed by me November 11, 1893, especially as regards Fig. 1 in each of the said applications.

I do not care to limit myself to the exact details of construction herein shown, and while it is designed to use all the above features in connection with each other, yet it is obvious that some may be used without the others, and the invention extends to such use. It will also be understood that the retarding action operates perfectly upon the masses through the gearing in driving the motor as a generator absorbing in this way the energy of the moving mass and bringing it rapidly to rest.

Having thus described my invention, what I claim as new, and desire to secure by Letters Patent, is—

1. In an electric brake for an electro-motor driven rotating mechanism, said motor being supplied with a controller and operating handle, means for disconnecting the motor entirely from its source of electrical supply, means for reversing the circuit relation of the armature and the field, means for connecting the terminals of such motor upon a local circuit containing a variable resistance, and means for utilizing the current for frictionally arresting the motion of such rotating mechanism, and means for varying the resistance within said local circuit, said means all being actuated by the movement of the said operating handle of the controller.

2. In an electric brake, a brake reel, a magnet co-operating therewith surrounding the axle, a crescent-shaped groove sunk in the face of such magnet and independent coils within such groove on opposite sides of the axle.

3. A disk-like electro-magnet arranged for lateral presentation consisting of a plurality of magnetic units, each having three curved polar faces, one being inner or near the center, another being outer or farthest removed from the center, and a third being arranged between the two, separate magnetizing coils suitably arranged about each middle pole, the said middle pole being of opposite polarity to the other two.

4. In an electric brake, a coil mounted on an axle, a separable casing for such coil provided with lugs for grasping an insulating disk, a disk and an electric contact borne by said disk.

5. The combination, with an electric motor, of a rheostat or variable resistance, means for cutting off all communication between the motor and the source of electric supply, and suitable means other than the motor or its parts for maintaining the direction of the current through the field magnets the same when the motor is used as a generator as when used for a motor, and for directing the current so generated through the said rheostat, a local circuit, and a brake magnet coil for said local circuit.

6. The combination, with an electric motor, of a reversing switch $d\ d'$ whereby the direction of the current through the field magnets of the motor can be controlled so as to remain the same when the motor is used as a generator as when used as a motor, the brake switch C arranged to open the line and close a local circuit, a rheostat or variable resistance, and a brake magnet coil substantially as described.

7. The combination, with an electric motor having two elements, namely, the stationary and a rotating element, of a rheostat or variable resistance, a reversing switch separate from the motor and connected to one of the elements, a centrally pivoted switch arm, a local circuit, and a brake magnet coil in the local circuit.

8. The combination, with an electric motor, a circuit, and a brake magnet coil in said circuit of a switch consisting of a single moving arm adapted when in one of its active positions to open the line circuit and close a local circuit through a rheostat the said magnet coil and the motor, and when in the other of its active positions to open the local circuit and close the line circuit through the rheostat and the motor; and means other than the motor or its parts for reversing the current direction through the coils of such motor, substantially for the purpose specified.

9. The combination, with an electric motor, of a rheostat R, a brake magnet coil as G', the reversing switch $d\ d'$, the brake switch C and suitable mechanical connection between the latter two whereby the switches may be operated simultaneously, substantially for the purpose specified.

10. The combination, with an electric motor, of a rheostat, a local circuit, a brake magnet coil in said local circuit, a reversing switch, a brake switch, mechanical connection between the two switches, and means for adjusting the relative positions of the switches mechanically whereby the reversing switch may be reversed without affecting the operation of the brake switch.

11. The combination, with an electric motor, of a variable resistance, a local circuit, a brake magnet coil, a brake switch arranged so that when the braking action is taking place the line circuit is open, the blade of said switch being permanently in connection with the variable resistance, and suitable electrical connection between the said variable resistance and the brake magnet coil, switch and motor, substantially as described.

12. A disk-like electro-magnet, arranged for lateral presentation, consisting of three curved polar faces, one being inner, or near the center, another being outer, or farthest removed from the center, and a third being arranged between the two, a magnetizing coil suitably arranged about the middle pole, the said middle pole being of opposite polarity to the other two.

13. In a disk-like electro-magnet arranged for lateral presentation consisting of a plurality of magnetic units each having three curved polar faces, one being inner or near the center, and another being outer or farthest removed from the center, and a third arranged between the two, separate magnetizing coils suitably arranged about the middle pole, in combination with a multiple arc circuit connection between said coils.

ELMER A. SPERRY.

Witnesses:
C. A. LONGFELLOW,
E. P. BITZER.